(12) United States Patent
Kiefer et al.

(10) Patent No.: US 7,795,372 B2
(45) Date of Patent: Sep. 14, 2010

(54) POLYMER FILM BASED ON POLYAZOLES, AND USES THEREOF

(75) Inventors: Joachim Kiefer, Losheim am See (DE); Gordon Calundann, North Plainfield, NJ (US); Oemer Uensal, Mainz (DE); Jochen Baurmeister, Eppstein (DE); Frauke Jordt, Eppstein (DE)

(73) Assignee: BASF Fuel Cell GmbH, Frankfurt (DE)

( * ) Notice: Subject to any disclaimer, the term of this patent is extended or adjusted under 35 U.S.C. 154(b) by 896 days.

(21) Appl. No.: 10/525,590

(22) PCT Filed: Aug. 14, 2003

(86) PCT No.: PCT/EP03/09020

§ 371 (c)(1),
(2), (4) Date: May 24, 2005

(87) PCT Pub. No.: WO2004/024797

PCT Pub. Date: Mar. 25, 2004

(65) Prior Publication Data

US 2005/0256296 A1 Nov. 17, 2005

(30) Foreign Application Priority Data

Aug. 29, 2002 (DE) .................... 102 39 701

(51) Int. Cl.
| C08G 69/26 | (2006.01) |
|---|---|
| C08G 69/42 | (2006.01) |
| C08G 69/48 | (2006.01) |
| C08G 73/08 | (2006.01) |
| C08G 73/18 | (2006.01) |
| C08G 73/22 | (2006.01) |

(52) U.S. Cl. ............... 528/327; 528/423; 528/272; 528/332; 528/335; 528/337; 528/487; 528/502 R; 528/502 C; 528/503

(58) Field of Classification Search ............. 528/327, 528/423, 272, 332, 335, 337, 487, 502 R, 528/502 C, 503
See application file for complete search history.

(56) References Cited

U.S. PATENT DOCUMENTS

| 3,224,908 A | 12/1965 | Duch et al. |
|---|---|---|
| 3,293,088 A | 12/1966 | Herbst et al. |
| 3,313,783 A | 4/1967 | Iwakura et al. |
| 3,737,045 A | 6/1973 | Hasimoto et al. |
| 3,808,305 A | 4/1974 | Gregor |
| 4,012,303 A | 3/1977 | D'Agostino et al. |
| 4,075,093 A | 2/1978 | Walch et al. |
| 4,187,333 A | 2/1980 | Rembaum et al. |
| 4,537,668 A | 8/1985 | Gaussens et al. |
| 4,622,276 A | 11/1986 | Walsh |
| 4,634,530 A | 1/1987 | Kuder et al. |
| 5,098,985 A | 3/1992 | Harris et al. |
| 5,211,984 A | 5/1993 | Wilson |
| 5,218,076 A | 6/1993 | Madison et al. |
| 5,312,895 A | 5/1994 | Dang et al. |
| 5,492,996 A | 2/1996 | Dang et al. |
| 5,599,639 A | 2/1997 | Neoya et al. |
| 5,633,337 A | 5/1997 | Tan et al. |
| 5,643,968 A | 7/1997 | Andreola et al. |
| 5,656,386 A | 8/1997 | Scherer et al. |
| 5,674,969 A | 10/1997 | Sikkema et al. |
| 6,030,718 A | 2/2000 | Fuglevand et al. |
| 6,087,032 A | 7/2000 | Yoshitake et al. |
| 6,096,369 A | 8/2000 | Anders et al. |
| 6,110,616 A | 8/2000 | Sheikh-Ali et al. |
| 6,197,147 B1 | 3/2001 | Bönsel et al. |
| 6,248,469 B1 | 6/2001 | Formato et al. |
| 6,368,587 B1 | 4/2002 | Anders et al. |
| 2001/0038937 A1 | 11/2001 | Suzuki et al. |
| 2002/0045085 A1 | 4/2002 | Formato et al. |
| 2004/0010731 A1 | 5/2004 | Jakoby et al. |

FOREIGN PATENT DOCUMENTS

| DE | 1 301 578 | 8/1969 |
|---|---|---|
| DE | 196 53 484 A 1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 9/1991 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 | 10/2003 |
| JP | 53-97988 | 8/1978 |
| JP | 2002146014 | 5/2002 |
| JP | 2003022709 | 1/2003 |
| WO | WO 94/25506 | 11/1994 |
| WO | WO 99/10165 | 3/1999 |
| WO | WO 00/49069 | 8/2000 |
| WO | WO 00/54351 | 9/2000 |

(Continued)

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995).
Polymeric Materials Science and Engineering, Y. Sakaguchi et al., vol. 84, 2001, p. 899-900.

*Primary Examiner*—Duc Truong
(74) *Attorney, Agent, or Firm*—Hammer & Associates, P.C.

(57) ABSTRACT

The present invention relates to a novel polymer film and also polymer fibers and polymers based on polyazoles, which can, owing to its excellent chemical and thermal properties, be used for a variety of purposes and is particularly useful as film or membrane for gas purification and filtration.

26 Claims, No Drawings

FOREIGN PATENT DOCUMENTS

| | | |
|---|---|---|
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 02/071518 A1 | 9/2002 |
| WO | WO 02/081547 A1 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |

POLYMER FILM BASED ON POLYAZOLES, AND USES THEREOF

RELATED APPLICATIONS

This application is the U.S. National Stage of International Application No. PCT/EP2003/009020 which was filed Aug. 14, 2003, was published in German, and claims priority under 35 U.S.C. §119 or 365 to German Application No. 102 39 701.5, filed Aug. 29, 2002.

The present invention relates to a novel polymer film based on polyazoles which can, owing to its excellent chemical and thermal properties, be used for a variety of purposes and is particularly useful as film or membrane for gas purification and filtration.

Polyazoles such as polybenzimidazoles (®Celazole) have been known for a long time. Such polybenzimidazoles (PBIs) are usually prepared by reacting 3,3',4,4'-tetraminobiphenyl with isophthalic or diphenylisophthalic acid or esters thereof in the melt. The prepolymer formed solidifies in the reactor and is subsequently broken up mechanically. The pulverulent prepolymer is subsequently polymerized fully in a solid-state polymerization at temperatures of up to 400° C. to give the desired polybenzimidazole.

To produce polymer films, the PBI is, in a further step, dissolved in polar, aprotic solvents such as dimethylacetamide (DMAc) and a film is produced by classical methods. However, complete removal of the solvent is not simple and requires a considerable outlay. A process which can be used for this purpose is described in the German patent application No. 10109829.4.

It is an object of the present invention to provide polymer films based on polyazoles which firstly have or surpass the use properties of polymer films based on polyazoles and secondly can be obtained in a simple manner.

We have now found that a polymer film based on polyazoles can be obtained when the parent monomers are suspended or dissolved in polyphosphoric acid, spread by means of a doctor blade to form a thin layer and polymerized in the polyphosphoric acid.

The present invention provides a polymer film based on polyazoles which is obtainable by a process comprising the steps
A) mixing of one or more aromatic tetramino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion,
B) application of a layer using the mixture from step A) to a support,
C) heating of the sheet-like structure/layer obtainable according to step B) under inert gas at temperatures of up to 350° C., preferably up to 280° C., to form the polyazole polymer,
D) treatment of the polymer film formed in step C) (until it is self-supporting),
E) detachment of the polymer film formed in step D) from the support, with step E not being absolutely necessary (when producing a composite membrane/multilayer membrane),
F) removal of the polyphosphoric acid or phosphoric acid present and drying.

The aromatic and heteroaromatic tetramino compounds used according to the invention are preferably 3,3',4,4'-tetraminobiphenyl, 2,3,5,6-tetraminopyridine, 1,2,4,5-tetraminobenzene, bis(3,4-diaminophenyl)sulfone, bis(3,4-diaminophenyl) ether, 3,3',4,4'-tetraminobenzophenone, 3,3',4,4'-tetraminodiphenylmethane and 3,3',4,4'-tetraminodiphenyldimethylmethane and their salts, in particular their monohydrochloride, dihydrochloride, trihydrochloride and tetrahydrochloride derivatives.

The aromatic carboxylic acids used according to the invention are dicarboxylic acids and tricarboxylic acids and tetracarboxylic acids or their esters or their anhydrides or their acid chlorides. The term aromatic carboxylic acids likewise encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoro-terephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)-hexafluoropropane, 4,4'-stilbenedicarboxylic acid, 4-carboxycinnamic acid, or their C1-C20-alkyl esters or C5-C12-aryl esters, or their acid anhydrides or acid chlorides. The aromatic tricarboxylic acids, tetracarboxylic acids or their C1-C20-alkyl esters or C5-C12-aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20-alkyl esters or C5-C12-aryl esters or their acid anhydrides or their acid chlorides are preferably 3,5,3',5'-biphenyltetra-carboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used according to the invention are heteroaromatic dicarboxylic acids and tricarboxylic acids and tetracarboxylic acids or their esters or their anhydrides. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine-dicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

The content of tricarboxylic acids or tetracarboxylic acids (based on dicarboxylic acid used) is in the range from 0 to 30 mol %, preferably from 0.1 to 20 mol %, in particular from 0.5 to 10 mol %.

The aromatic and heteroaromatic diaminocarboxylic acids used according to the invention are preferably diaminobenzoic acid and their monohydrochloride and dihydrochloride derivatives.

Mixtures of at least 2 different aromatic carboxylic acids are preferably used in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1.

These mixtures are, in particular, mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxy-isophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoro-methylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine-dicarboxylic acid, 3,5-pyrazoledicarboxylic acid, 2,6-pyrimidinedicarboxylic acid, 2,5-pyrazinedicarboxylic acid.

The polyphosphoric acid used in step A) is a commercial polyphosphoric acid as can be obtained, for example, from Riedel-de Haen. The polyphosphoric acids $H_{n+2}P_nO_{3n+1}$ (n>1) usually have an assay calculated as $P_2O_5$ (acidimetric) of at least 83%. In place of a solution of the monomers, it is also possible to produce a dispersion/suspension. The mixture produced in step A) has a weight ratio of polyphosphoric acid to the sum of all monomers of from 1:10 000 to 10 000:1, preferably from 1:1000 to 1000:1, in particular from 1:100 to 100:1.

The layer formation in step B) is carried out by measures known per se (casting, spraying, spreading by doctor blade) known from the prior art for polymer film production. As supports, it is possible to use all supports which are inert under the conditions. In addition to these inert supports, it is also possible to use other supports such as polymer films, woven fabrics and nonwovens which bond to the layer formed in step B) to form a laminate. To adjust the viscosity, the solution can, if appropriate, be admixed with phosphoric acid (concentrated phosphoric acid, 85%). In this way, the viscosity can be set to the desired value and the formation of the membrane can be made easier.

The layer produced in step B) has a thickness which is matched to the subsequent use and is not subject to any restrictions. The layer formed usually has a thickness of from 1 to 5 000 μm, preferably from 1 to 3 500 μm, in particular from 1 to 100 μm.

The polyazole-based polymer formed in step C) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

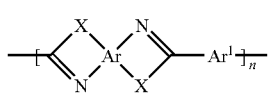
(I)

-continued

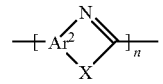
(II)

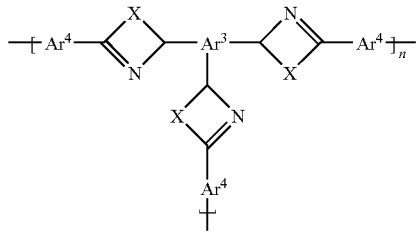
(III)

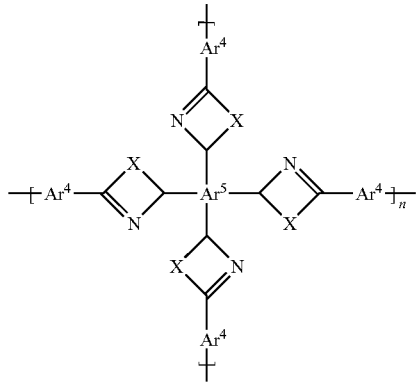
(IV)

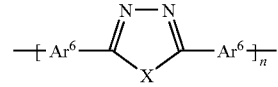
(V)

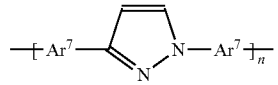
(VI)

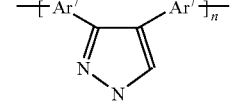
(VII)

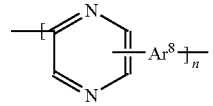
(VIII)

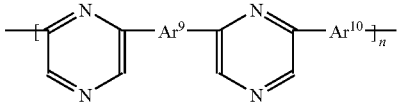
(IX)

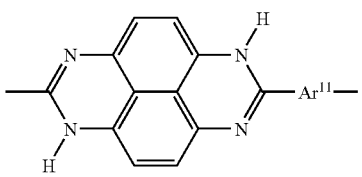
(X)

-continued

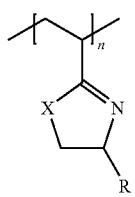
(XI)

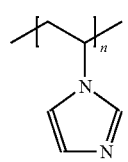
(XII)

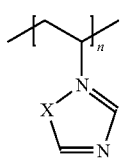
(XIII)

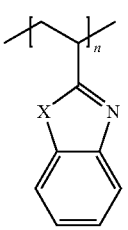
(XIV)

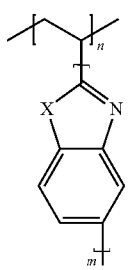
(XV)

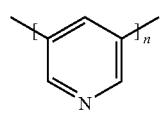
(XVI)

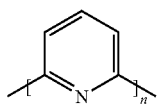
(XVII)

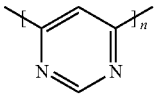
(XVIII)

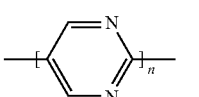
(XIX)

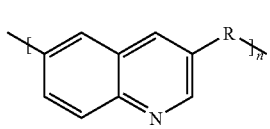
(XX)

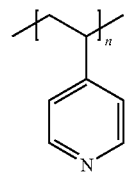
(XXI)

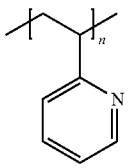
(XXII)

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, preferably a branched or unbranched alkyl or alkoxy group, or an aryl group as further radical,
the radicals R are identical or different and are each hydrogen, an alkyl group or an aromatic group, with the proviso that R in the formula (XX) is not hydrogen, and
n, m are each an integer greater than or equal to 10, preferably greater than or equal to 100.
Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine; triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, acridine, phenazine, benzoquinoline, phenoxazine, phenothiazine, acridizine, benzopteridine, phenanthroline and phenanthrene, which may also be substituted.

$Ar^1$, $Ar^4$, $Ar^5$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further, preferred polyazole polymers are polyimidazoles, polybenzothiazoles, polybenzoxazoles, polyoxadiazoles, polyquinoxalines, polythiadiazoles, poly-(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole comprising only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

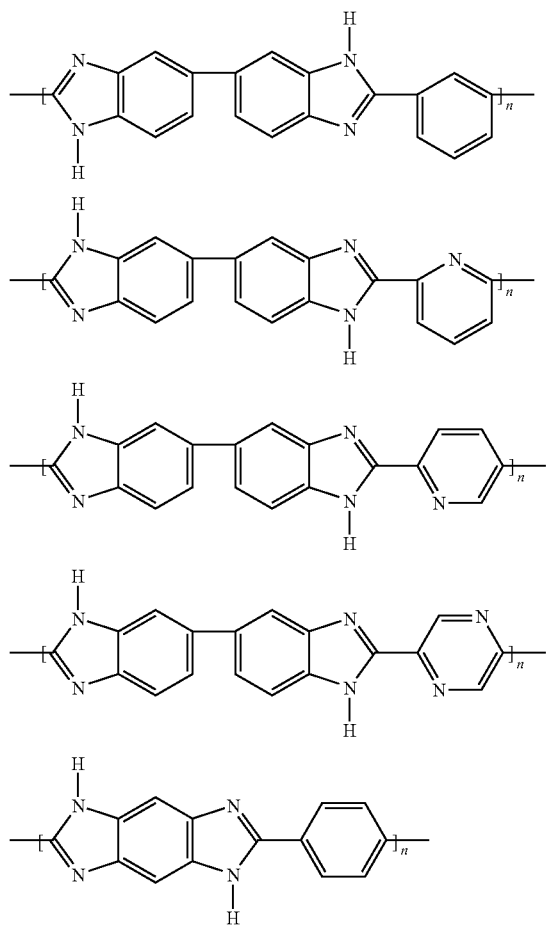
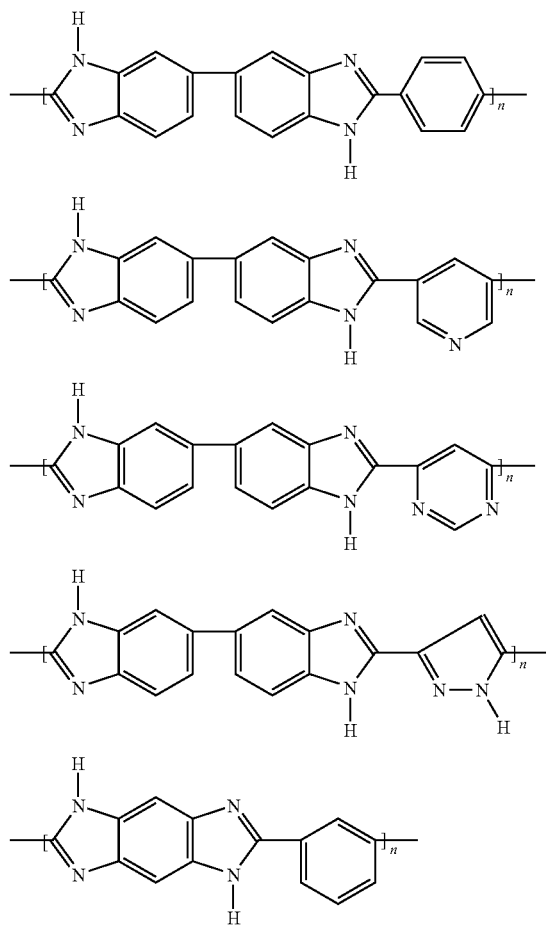

-continued
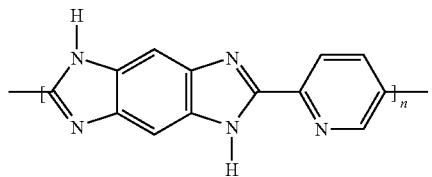
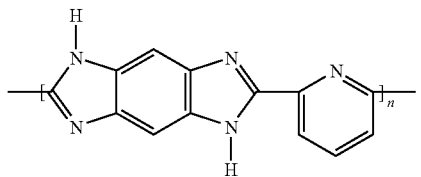
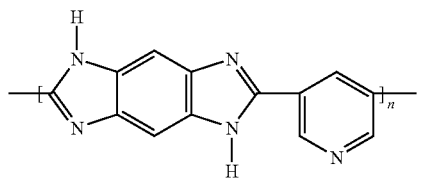
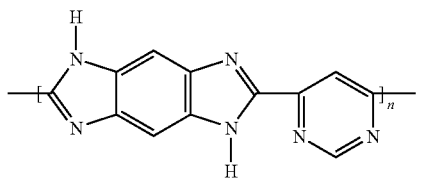
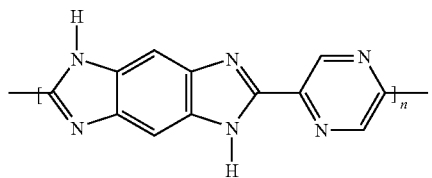
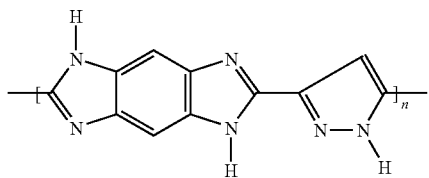
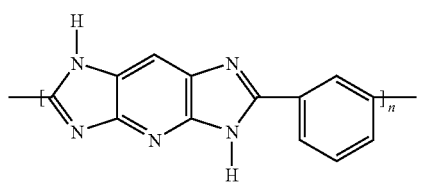
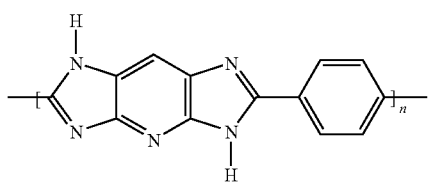
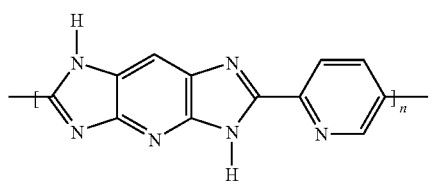
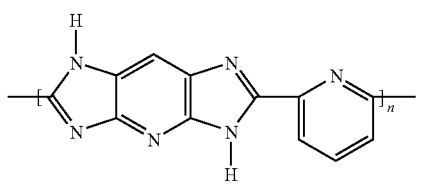
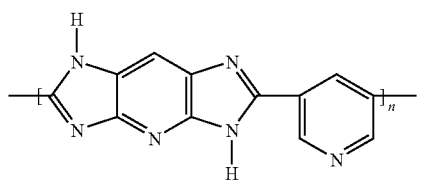
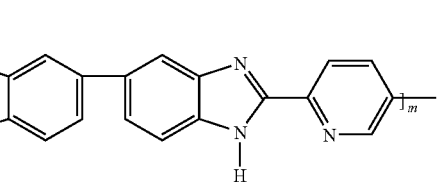
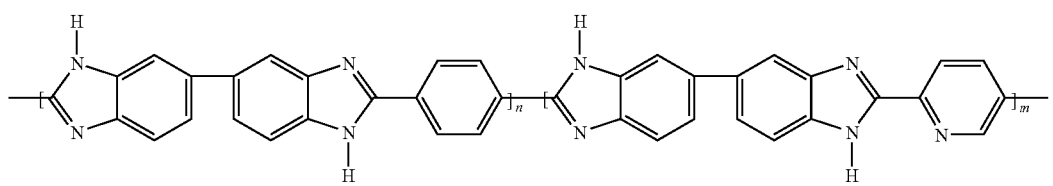
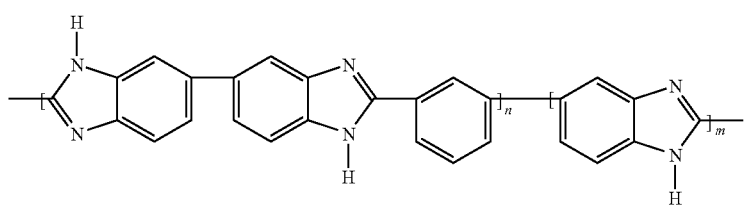
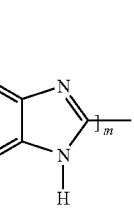

where n and m are each an integer greater than or equal to 10, preferably greater than or equal to 100.

The polyazoles obtainable by means of the process described, but in particular the polybenzimidazoles, have a high molecular weight. Measured as intrinsic viscosity, it is at least 1.4 dl/g and is thus significantly above that of commercial polybenzimidazole (IV<1.1 dl/g).

If tricarboxylic acids and/or tetracarboxylic acids are present in the mixture obtained in step A), they effect branching/crosslinking of the polymer formed. This contributes to an improvement in the mechanical properties. The polymer layer produced in step C) is treated in the presence of moisture at temperatures and for a time sufficient for the layer to have sufficient strength for the intended purpose. The treatment can be carried out until the membrane is self-supporting, so that it can be detached from the support without damage (step E).

In one variant of the process, the formation of oligomers and/or polymers can be brought about by heating the mixture from step A) to temperatures of up to 350° C., preferably up to 280° C. Depending on the temperature and time selected, the heating in step C) may be able to be partly or entirely omitted. This variant is also provided by the present invention.

Furthermore, it has been found that when using aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxy-isophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazine-dicarboxylic acid, the temperature in step C), or if the formation of oligomers and/or polymers is desired as early as step A), is advantageously in the range up to 300° C., preferably in the range from 100° C. to 250° C.

The treatment of the polyester film in step D) is carried out at temperatures above 0° C. and less than 150° C., preferably at temperatures in the range from 10° C. to 120° C., in particular from room temperature (20° C.) to 90° C., in the presence of moisture or water and/or steam and/or water-containing phosphoric acid having a concentration of up to 85%. The treatment is preferably carried out under atmospheric pressure, but can also be carried out under superatmospheric pressure. It is important that the treatment is carried out in the presence of sufficient moisture, as a result of which the polyphosphoric acid present contributes to strengthening of the polymer film by partial hydrolysis to form low molecular weight polyphosphoric acid and/or phosphoric acid.

The partial hydrolysis of the polyphosphoric acid in step D) leads to strengthening of the polymer film so that it becomes self-supporting and also leads to a decrease in the layer thickness.

The intramolecular and intermolecular structures (interpenetrating networks IPNs) present in the polyphosphoric acid layer formed in step B) lead in step C) to ordered membrane formation, which is responsible for the good properties of the polymer film formed.

The upper temperature limit to the treatment in step D) is generally 150° C. In the case of extremely brief action of moisture, for example of superheated steam, this steam can also be hotter than 150° C. The duration of the treatment is important in determining the upper temperature limit.

The partial hydrolysis (step D) can also be carried out in chambers having a controlled temperature and humidity, in which case the hydrolysis can be controlled in a targeted fashion in the presence of a defined amount of moisture. The humidity can be set to a specific value by means of the temperature or saturation of the environment in contact with the polymer film, for example gases such as air, nitrogen, carbon dioxide or other suitable gases or steam. The treatment time is dependent on the parameters selected above.

The treatment time is also dependent on the thickness of the membrane.

In general, the treatment time ranges from a few seconds to some minutes, for example in the presence of superheated steam, or up to entire days, for example in air at room temperature and relatively low atmospheric humidity. The treatment time is preferably from 10 seconds to 300 hours, in particular from 1 minute to 200 hours.

If the partial hydrolysis is carried out at room temperature (20° C.) by means of ambient air at a relative atmospheric humidity of 40-80%, the treatment time is in the range from 1 to 200 hours.

The polymer film obtained according to step D) is preferably self-supporting, i.e. it can be detached from the support without damage in step E) and subsequently, if appropriate, be directly used further.

If the polymer film obtained according to step C) is processed further on the support, for example to produce a composite membrane, step D) can be entirely or partly omitted. In this case, this likewise applies to step E) and possibly also to step F) if the polyphosphoric acid does not interfere in subsequent processing. This variant is also provided by the present invention.

Subsequent to step E), the polyphosphoric acid or phosphoric acid present in the polymer film is removed in step F). This is carried out by means of a treatment liquid in the temperature range from room temperature (20° C.) to the boiling point of the treatment liquid (at atmospheric pressure).

Treatment liquids used for the purposes of the invention and for the purposes of step F) are solvents which are in liquid form at room temperature [i.e. 20° C.] and are selected from the group consisting of alcohols, ketones, alkanes (aliphatic and cycloaliphatic), ethers (aliphatic and cycloaliphatic), glycols, esters, carboxylic acids, with the above group members being able to be halogenated, water and mixtures thereof.

Preference is given to using C1-C10-alcohols, C2-C5-ketones, C1-C10-alkanes (aliphatic and cycloaliphatic), C2-C6-ethers (aliphatic and cycloaliphatic), C2-C5-esters, C1-C3-carboxylic acids, dichloromethane, water and mixtures thereof.

The treatment liquid introduced in step F) is subsequently removed again. This is preferably achieved by means of drying, with the temperature and the ambient pressure being chosen as a function of the partial vapor pressure of the treatment liquid. Drying is usually carried out at atmospheric pressure and temperatures in the range from 20° C. to 200° C. More gentle drying can also be carried out under reduced pressure. In place of drying, the membrane can also be dabbed off and in this way freed of excess treatment liquid. The order is not critical.

Subsequent to the treatment according to step F), the polymer film can be additionally crosslinked on the surface by the action of heat in the presence of atmospheric oxygen. This hardening of the film surface achieves an additional improvement in the properties. This treatment can partly or completely replace the abovementioned drying, or can be combined therewith.

Crosslinking can also be effected by action of IR or NIR (IR=infrared, i.e. light having a wavelength of more than 700 nm; NIR=near IR, i.e. light having a wavelength in the range from about 700 to 2 000 nm or an energy in the range from about 0.6 to 1.75 eV). A further method is irradiation with β-rays. The radiation dose is in the range from 5 to 200 kGy.

Furthermore, a thermal after-treatment with sulfuric acid can be carried out subsequent to the treatment according to step F). This leads to a further improvement in the surface in terms of use properties.

The polymer film of the invention displays improved materials properties compared to the polymer films known hitherto.

In addition, the polymer film of the invention displays not only the known advantages of separation membranes based on polyazoles, e.g. high thermal stability and resistance to chemicals, but also improved mechanical properties as a result of the relatively high molecular weight. This leads to an increased long-term stability and life and also to improved separation behavior.

In particular, however, these polymer films contain no impurities which can be removed only at high cost or incompletely.

Such separation membranes can be produced as dense polymer films, porous hollow fiber membranes or porous polymer films or, if desired, as a composite membrane (comprising a plurality of layers having a differing open porosity, partly provided with a thin dense film). The layers can consist of different polymer layers or can be produced as an integral asymmetric membrane from one polymer.

To produce a porous membrane, the polymer solution from step A) can further comprise a pore former such as glycerol.

The porous membrane can be filled with glycerol to stabilize the pores after the production process.

During the treatment in step F), solvent replacement leads to the formation of known porous structures: Depending on the composition of the precipitant, different morphologies of the separation membranes can be obtained in this way. For separation applications, preference is given to the following structures:

i) symmetrical, porous structure; ii) asymmetric porous structure having denser polymer closer to one membrane surface and iii) porous films of type i) and ii) coated with a thin selective polymer layer. Furthermore, the individual layers can consist of different types of polymer. Scanning electron micrographs of such particularly useful structures of a polybenzimidazole membrane are disclosed in Journal of Membrane Science, volume 20, 1984, pages 147-66.

Such phase inversion membranes and structures are known to those skilled in the art. Membranes having an asymmetric or symmetrical porous structure are employed as separation or filtration membranes for air and gas filtration or microfiltration or ultrafiltration and the dialysis of liquids. Membranes consisting of a thin, dense selective layer applied to membranes having an asymmetric porous structure or composite membranes can be used in a variety of ways for reverse osmosis, nanofiltration, in particular for desalination of water, or for gas purification. Dense films can be used for electrodialysis or electrolysis.

A particularly advantageous application is the separation of hydrogen and carbon dioxide from gas mixtures in combination with a porous metallic support. Alternative technologies for separating off $CO_2$ require, owing to the low thermal stability of the polymer membrane, cooling of the gas to 150° C., which reduces the efficiency. The polyazole-based separation membranes of the invention can be operated on a long term basis at temperatures of up to 400° C. and thus lead to an increase in the yield and a reduction in costs.

Further information on separation membranes based on polyazoles may be found in the specialist literature, in particular the patents WO 98/14505; U.S. Pat. No. 4,693,815; U.S. Pat. No. 4,693,824; U.S. Pat. No. 375,262; U.S. Pat. No. 3,737,042; U.S. Pat. No. 4,512,894; U.S. Pat. No. 448,687; U.S. Pat. No. 3,841,492. The disclosure in respect of the structure and production of separation membranes in the abovementioned references is encompassed by the present invention and is incorporated by reference into the present description. In particular, such separation membranes can be produced in the form of flat films or as hollow fiber membranes.

To achieve a further improvement in the use properties, fillers can also be added to the polymer film. The addition can be carried out either in step A or after the polymerization.

Nonlimiting examples of such fillers are

| | |
|---|---|
| oxides such as | $Al_2O_3$, $Sb_2O_5$, $ThO_2$, $SnO_2$, $ZrO_2$, $MoO_3$, |
| silicates such as | zeolites, zeolites($NH_4+$), sheet silicates, framework silicates, H-natrolites, H-mordenites, $NH_4$-analcines, $NH_4$-sodalites, $NH_4$-gallates, H-montmorillonites, |
| fillers such as | carbides, in particular SiC, $Si_3N_4$, fibers, in particular glass fibers, glass powders and/or polymer fibers, preferably ones based on polyazoles. |

Furthermore, the polymer film can further comprise additives which scavenge or destroy free radicals which may have been formed during gas filtration.

Nonlimiting examples of such additives are: bis(trifluoromethyl) nitroxide, 2,2,-diphenyl-1-picrinylhydrazyl, phenols, alkylphenols, sterically hindered alkylphenois such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl-2-nitroso-propane, benzophenone, benzaldehyde tert-butyl nitron, cysteamine, melanines, lead oxides, manganese oxides, nickel oxides, cobalt oxides.

Possible fields of use of the polymer films of the invention include, inter alia, use as filter medium in gas filtration and as membrane in the field of gas separation or gas purification, and also in reverse osmosis, nanofiltration, ultrafiltration, microfiltration, dialysis and electrodialysis. They can also be used as substrates for flexible electric circuits, as battery separators, as membranes in electrolysis, as protective film for electric cables, as insulator in electrical components and devices such as capacitors, as protective film for metal and other surfaces.

The present invention thus further provides a polymer based on polyazoles having the abovementioned features whose molecular weight expressed as intrinsic viscosity is at least 1.4 dl/g and which is obtainable by a process comprising the steps A) mixing of one or more aromatic tetramino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion, B) heating of the mixture obtainable according to step A) under inert gas at temperatures of up to 350° C., preferably up to 280° C., to form the polyazole polymer, C) precipitation of the polymer formed in step B), isolation and drying of the polymer powder obtained.

The preferred embodiments for steps A) and B) have been presented above, so that they will not be repeated at this point. The precipitation in step C) can be carried out by introducing the material from step B) into a precipitation bath. This introduction is carried out in the temperature range from room temperature (20° C.) to the boiling temperature of the precipitation liquid (at atmospheric pressure).

Precipitation liquids used for the purposes of the invention and for the purposes of step C) are solvents which are in liquid form at room temperature [i.e. 20° C.] and are selected from the group consisting of alcohols, ketones, alkanes (aliphatic and cycloaliphatic), ethers (aliphatic and cycloaliphatic), esters, carboxylic acids, with the above group members being able to be halogenated, water, inorganic acids (e.g. $H_3PO_4$, $H_2SO_4$) and mixtures thereof.

Preference is given to using C1-C10-alcohols, C2-C5-ketones, C1-C10-alkanes (aliphatic and cycloaliphatic), C2-C6-ethers (aliphatic and cycloaliphatic), C2-C5-esters, C1-C3-carboxylic acids, dichloromethane, water and mixtures thereof.

The precipitated polymer is subsequently freed of the precipitation liquid again. This is preferably achieved by means of drying, with the temperature and the ambient pressure being chosen as a function of the partial vapor pressure of the precipitation liquid. Drying is usually carried out at atmospheric pressure and temperatures in the range from 20° C. to 200° C. More gentle drying can be carried out under reduced pressure. The drying method is not subject to any restriction.

The polyazoles obtainable by means of the process described, but in particular the polybenzimidazoles, have a high molecular weight. Measured as intrinsic viscosity, this is at least 1.4 dl/g, preferably at least 1.5 dl/g, and is thus significantly above that of commercial polybenzimidazole (IV<1.1 dl/g).

The polymer powders obtained in this way are particularly suitable as raw material for producing shaped bodies, in particular films and fibers.

The present invention further provides a polymer fiber based on polyazoles whose molecular weight expressed as intrinsic viscosity is at least 1.4 dl/g and which is obtainable by a process comprising the steps A) mixing of one or more aromatic tetramino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion, B) heating of the mixture from step A) at temperatures of up to 350° C., preferably up to 280° C., to form the polyazole polymer, C) extrusion of the polyazole polymer formed in step B) to form fibers, D) introduction of the fibers formed in step C) into a bath of liquid, E) isolation and drying of the fibers obtained.

The preferred embodiments for the steps A) and B) have been presented above, so that they will not be repeated at this point.

Extrusion in step C) can be carried out by means of all known fiber formation methods. The fibers formed can be continuous filaments or, if fiber formation is carried out by a method analogous to the "melt blow method", have the character of staple fibers. The thicknesses of the fibers formed are not subject to any restriction, so that monofilaments, i.e. wire-like fibers, can also be produced. In addition, hollow fibers can also be produced. The desired thickness is determined by the intended use of the fiber. The total treatment of the fiber formed can be carried out by means of known fiber technologies.

In a variant of the invention, the polyazole polymer extruded in step C) is saturated beforehand with a gas. All gases which are inert under the chosen conditions are suitable for this purpose. Saturation is preferably effected in the supercritical state, so that the gas forms pores on subsequent expansion. This technology is known under the trade name MuCell®. Application of the MuCell technology to the process of the invention makes it possible for the first time to obtain microfoams of polyazole polymers, in particular foams based on the polymers polyimidazoles, polybenzothiazoles, polybenzoxazoles, polyoxadiazoles, polyquinoxalines, polythiadiazoles, poly(pyridines), poly(pyrimidines) and poly(tetrazapyrenes).

After extrusion according to step C), the fibers formed are introduced into a precipitation bath. This introduction is carried out in the temperature range from room temperature (20° C.) and the boiling temperature of the precipitation liquid (at atmospheric pressure).

Precipitation liquids used for the purposes of the invention and for the purposes of step C) are solvents which are in liquid form at room temperature [i.e. 20° C.] and are selected from the group consisting of alcohols, ketones, alkanes (aliphatic and cycloaliphatic), ethers (aliphatic and cycloaliphatic), esters, carboxylic acids, with the above group members being able to be halogenated, water, inorganic acids (e.g. $H_3PO_4$, $H_2SO_4$) and mixtures thereof.

Preference is given to using C1-C10-alcohols, C2-C5-ketones, C1-C10-alkanes (aliphatic and cycloaliphatic), C2-C6-ethers (aliphatic and cycloaliphatic), C2-C5-esters, C1-C3-carboxylic acids, dichloromethane, water and mixtures thereof.

The fiber is subsequently freed of the precipitation liquid. This is preferably achieved by means of drying, with the temperature and the ambient pressure being chosen as a function of the partial vapor pressure of the precipitation liquid. Drying is usually carried out at atmospheric pressure and temperatures in the range from 20° C. to 200° C. More gentle drying can be carried out under reduced pressure. The drying method is not subject to any restriction.

The treatment in the precipitation bath can lead to formation of porous structures. Depending on the use, these are desired for subsequent use.

In one variant, the fibers formed after extrusion according to step C) can be subjected to a treatment as described in step D). This treatment of the fibers is carried out at temperatures above 0° C. and less than 150° C., preferably at temperatures in the range from 10° C. to 120° C., in particular from room temperature (20° C.) to 90° C., in the presence of moisture or water and/or water vapor and/or water-containing phosphoric acid having a concentration of up to 85%. The treatment is preferably carried out at atmospheric pressure, but can also be carried out under superatmospheric pressure. It is important that the treatment is carried out in the presence of sufficient moisture, as a result of which the polyphosphoric acid present contributes to strengthening of the fiber by partial hydrolysis to form low molecular weight polyphosphoric acid and/or phosphoric acid.

The partial hydrolysis of the polyphosphoric acid leads to strengthening of the fiber, which leads to this being self-supporting and also leads to a decrease in the thickness of the fiber.

The intramolecular and intermolecular structures (interpenetrating networks IPNs) present in the polyphosphoric acid layer lead to an ordered polymer structure which is responsible for the good properties of the fiber formed.

The upper temperature limit for the treatment is generally 150° C. In the case of extremely brief action of moisture, for example of superheated steam, this steam can also be hotter than 150° C. The duration of the treatment is important in determining the upper temperature limit.

The partial hydrolysis (step D) can also be carried out in chambers having a controlled temperature and humidity, in which case the hydrolysis can be controlled in a targeted fashion in the presence of a defined amount of moisture. The humidity can be set to a specific value by means of the temperature or saturation of the environment in contact with the fiber, for example gases such as air, nitrogen, carbon dioxide or other suitable gases or steam. The treatment time is dependent on the parameters selected above.

The treatment time is also dependent on the thickness of the fiber.

In general, the treatment time ranges from a few fractions of a second to a number of seconds, for example in the presence of superheated steam, or heated humid air.

In principle, the treatment can also be carried out at room temperature (20° C.) by means of ambient air at a relative atmospheric humidity of 40-80%. However, this increases the treatment time.

The invention claimed is:

1. A polymer film based on polyazoles which is obtained by a process comprising the steps
    A) mixing one or more aromatic tetramino compounds with one or more aromatic carboxylic acids or esters thereof which contain at least two acid groups per carboxylic acid monomer, or mixing of one or more aromatic or heteroaromatic diaminocarboxylic acids, in polyphosphoric acid to form a solution or dispersion,
    B) applying a layer using the mixture from step A) to a support,
    C) heating the layer obtained according to step B) under inert gas at temperatures of up to 350° C. to form a polyazole polymer, wherein the polyazole polymer has an intrinsic viscosity of at least 1.4 dl/g,
    D) treating the polymer film formed in step C) until it is self-supporting,
    E) detaching the polymer film formed in step D) from the support,
    F) removing the polyphosphoric acid or phosphoric acid present and drying.

2. The polymer film of claim 1, wherein the aromatic tetramino compounds are selected from the group consisting of 3,3',4,4'-tetraminobiphenyl, 2,3,5,6-tetraminopyridine, 1,2,4,5-tetraminobenzene, bis(3,4-diaminophenyl) sulfone, bis(3,4-diaminophenyl)ether, 3,3',4,4'-tetraminobenzophenone, 3,3',4,4'-tetraminodiphenylmethane, and 3,3',4,4'-tetraminodiphenyldimethylmethane.

3. The polymer film of claim 1, wherein the aromatic dicarboxylic acids are selected from the group consisting of isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-carboxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, their C1-C20-alkyl esters, their C5-C12-aryl esters, their acid anhydrides, and their acid chlorides.

4. The polymer film of claim 1, wherein the aromatic carboxylic acids are selected from the group consisting of tricarboxylic acids, tetracarboxylic acids, their C1-C20-alkyl esters, their C5-C12-aryl esters, their acid anhydrides, and their acid chlorides.

5. The polymer film of claim 4, wherein the aromatic carboxylic acids are selected from the group consisting of 1,3,5-benzenetricarboxylic acid (trimesic acid); 1,2,4-benzenetricarboxylic acid (trimellitic acid); (2-carboxyphenyl)iminodiacetic acid; 3,5,3'-biphenyltricarboxylic acid; 3,5,4'-biphenyltricarboxylic acid; and 2,4,6-pyridinetricarboxylic acid.

6. The polymer film of claim 1, wherein the aromatic carboxylic acids are selected from the group consisting of tetracarboxylic acids, their C1-C20-alkyl esters, their C5-C12-aryl esters, their acid anhydrides, and their acid chlorides.

7. The polymer film of claim 6, wherein the aromatic carboxylic acids are selected from the group consisting of benzene-1,2,4,5-tetracarboxylic acid, naphthalene-1,4,5,8-tetracarboxylic acid, 3,5,3',5'-biphenyltetracarboxylic acid; benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, and 1,4,5,8-naphthalenetetracarboxylic acid.

8. The polymer film of claim 4, wherein the content of tricarboxylic acids and tetracarboxylic acids (based on dicarboxylic acid used) is from 0 to 30 mol %.

9. The polymer film of claim 1, wherein the heteroaromatic carboxylic acids used are heteroaromatic dicarboxylic acids and tricarboxylic acids and tetracarboxylic acids in which at least one nitrogen, oxygen, sulfur or phosphorus atom is present in the aromatic.

10. The polymer film of claim 9, wherein the heteroaromatic carboxylic acids used are selected from the group consisting of pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, their C1-C20-alkyl esters, their C5-C12-aryl esters, their acid anhydrides, and their acid chlorides.

11. The polymer film of claim 1, wherein a polyphosphoric acid having an assay calculated as P2O5 (acidimetric) of at least 83% is used in step A).

12. The polymer film of claim 1, wherein a solution or a dispersion/suspension is produced in step A).

13. The polymer film of claim 1, wherein a polyazole-based polymer comprising recurring azole units of one or more of the general formula (I), (II), (III), (IV), (V), (VI), (VII), (VIII), (IX), (X), (XI), (XII), (XIII), (XIV), (XV), (XVI), (XVII), (XVIII), (XIX), (XX), (XXI), or (XXII):

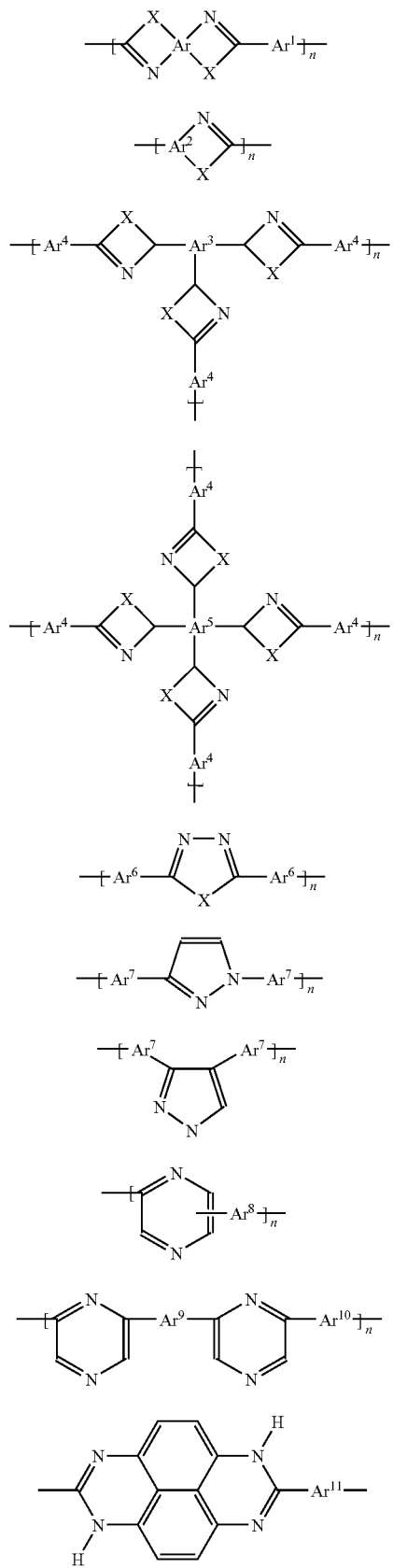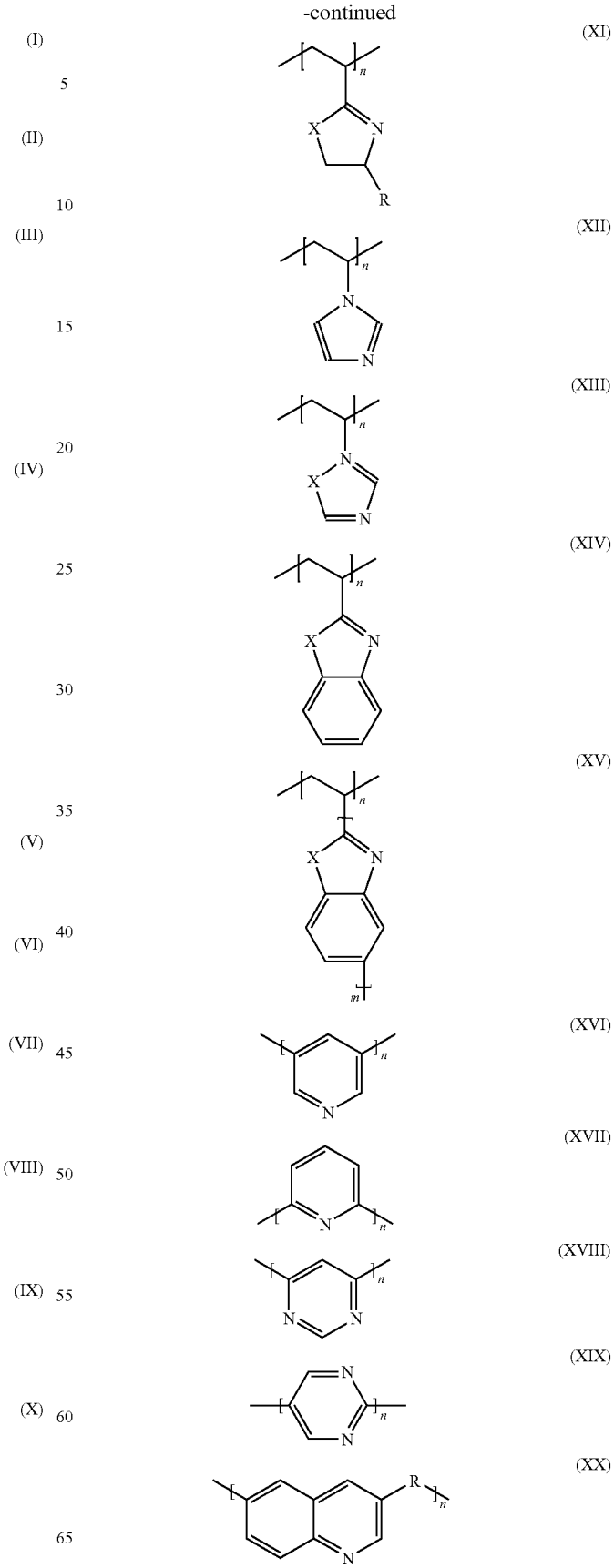

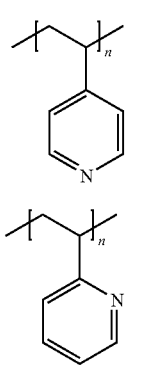

where
the radicals Ar are identical or different and are each a tetravalent aromatic or heteroaromatic group which can be monocyclic or polycyclic,
the radicals Ar1 are identical or different and are each a divalent aromatic or heteroaromatic group which can be monocyclic or polycyclic,
the radicals Ar2 are identical or different and are each a divalent or trivalent aromatic or heteroaromatic group which can be monocyclic or polycyclic,
the radicals Ar3 are identical or different and are each a trivalent aromatic or heteroaromatic group which can be monocyclic or polycyclic,
the radicals Ar4 are identical or different and are each a trivalent aromatic or heteroaromatic group which can be monocyclic or polycyclic,
the radicals Ar5 are identical or different and are each a tetravalent aromatic or heteroaromatic group which can be monocyclic or polycyclic,
the radicals Ar6 are identical or different and are each a divalent aromatic or heteroaromatic group which can be monocyclic or polycyclic,
the radicals Ar7 are identical or different and are each a divalent aromatic or heteroaromatic group which can be monocyclic or polycyclic,
the radicals Ar8 are identical or different and are each a trivalent aromatic or heteroaromatic group which can be monocyclic or polycyclic,
the radicals Ar9 are identical or different and are each a divalent or trivalent or tetravalent aromatic or heteroaromatic group which can be monocyclic or polycyclic,
the radicals Ar10 are identical or different and are each a divalent or trivalent aromatic or heteroaromatic group which can be monocyclic or polycyclic,
the radicals Ar11 are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, or an aryl group as further radical,
the radicals R are identical or different and are each hydrogen, an alkyl group or an aromatic group, with the proviso that R in the formula (XX) is not hydrogen, and
n, m are each an integer greater than or equal to 10, is formed in step C).

14. The polymer film of claim 1, wherein a polymer selected from the group consisting of polybenzimidazole, poly(pyridines), poly(pyrimidines), polyimidazoles, polybenzothiazoles, polybenzoxazoles, polyoxadiazoles, polyquinoxalines, polythiadiazoles, and poly(tetrazapyrenes) is formed in step C).

15. The polymer film of claim 1, wherein a polymer comprising recurring benzimidazole units of the formula

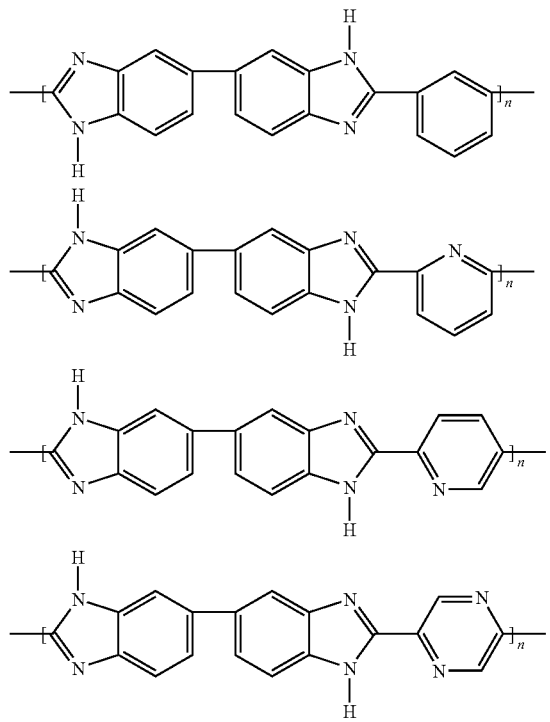

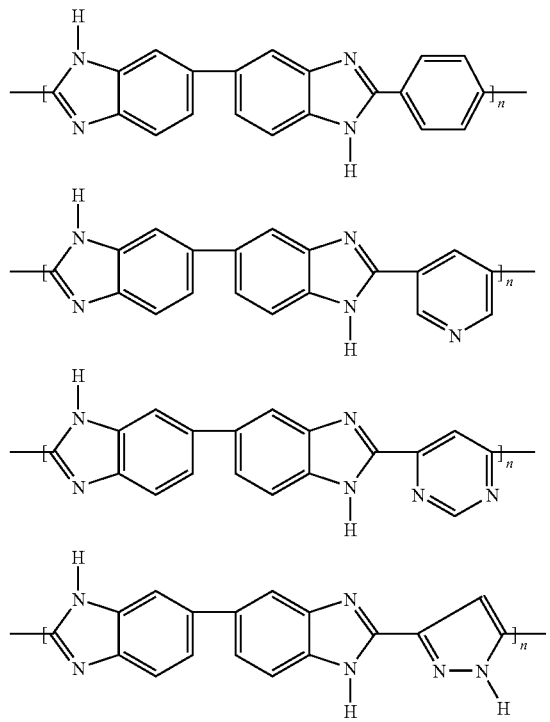

-continued
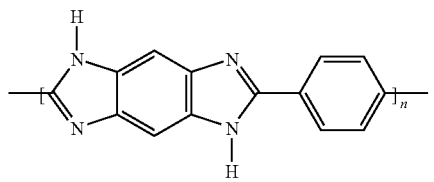
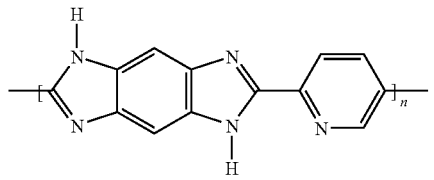
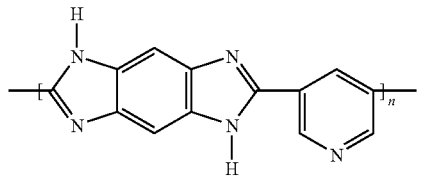
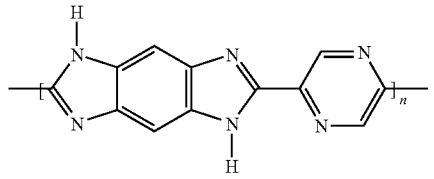
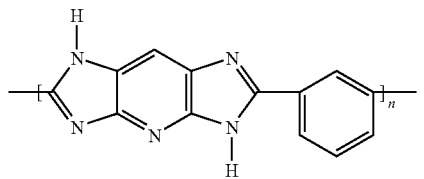
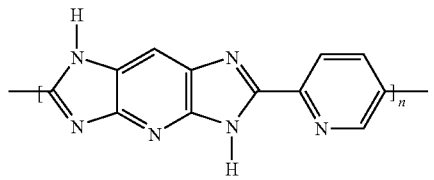
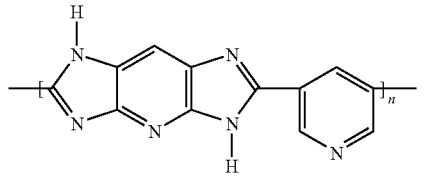
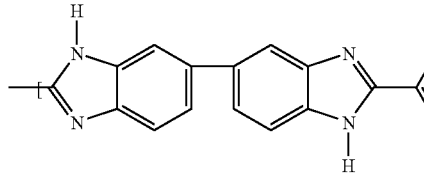
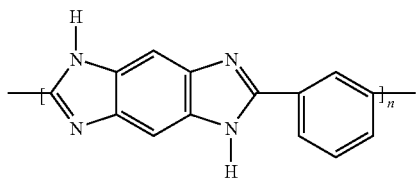
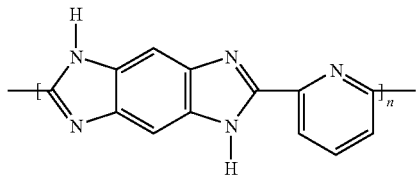
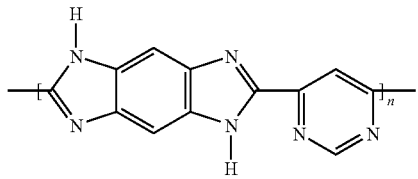
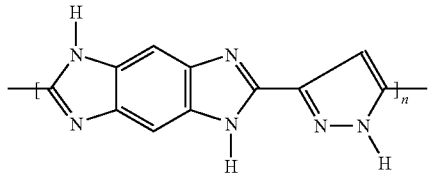
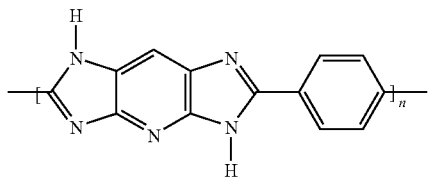
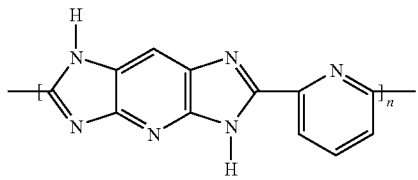
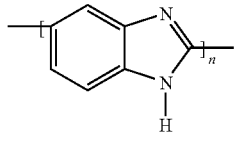
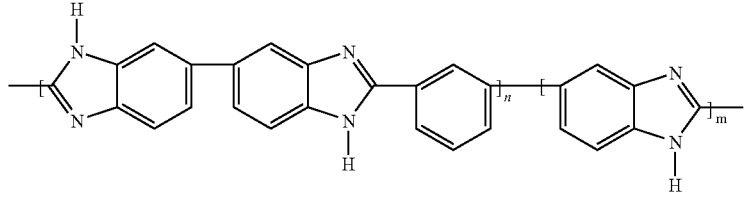
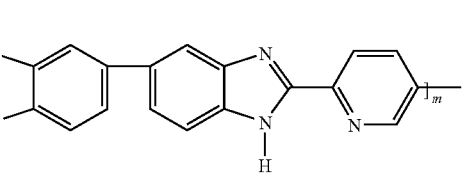
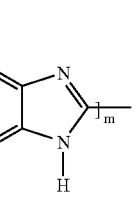

where n and m are each an integer greater than or equal to 10 is formed in step C).

16. The polymer film of claim 1, further including a step of adjusting the viscosity by addition of phosphoric acid after step A) and before step B).

17. The polymer film of claim 1, wherein the membrane produced according to step C) is treated in the presence of moisture at temperatures and for a time sufficient for the membrane to be self-supporting and to be able to be detached from the support without damage.

18. The polymer film of claim 1, wherein the treatment of the membrane in step D) is carried out at temperatures of from greater than 0° C. to 150° C. in the presence of moisture.

19. The polymer film of claim 1, wherein the treatment of the membrane in step D) is carried out for from 10 seconds to 300 hours.

20. The polymer film of claim 1, wherein the removal of the polyphoshoric acid or the phosphoric acid in step F) is carried out by means of a treatment liquid.

21. The polymer film of claim 1, wherein the treatment in step D) is omitted.

22. The polymer film of claim 1, wherein the polymer film is not self-supporting after the treatment in step D) and remains on the support for further processing.

23. A polymer fiber based on a polyazoles of claim 13 whose intrinsic viscosity is at least 1.4 dl/g and which is obtained by a process comprising the steps
   A) mixing one or more aromatic tetramino compounds with one or more aromatic carboxylic acids or esters thereof which contain at least two acid groups per carboxylic acid monomer, or mixing of one or more aromatic or heteroaromatic diaminocarboxylic acids, in polyphosphoric acid to form a solution or dispersion,
   B) heating the mixture from step A) at temperatures of up to 350° C. to form the polyazole polymer,
   C) extruding the polyazole polymer formed in step B) to form fibers,
   D) introducing the fibers formed in step C) into a bath of liquid,
   E) isolating and drying of the fibers obtained.

24. The polymer fiber of claim 23, wherein the fibers formed in step C) are introduced into a precipitation bath.

25. The polymer fiber of claim 23, wherein the polyazole polymer extruded in step C) is saturated with a gas so that the gas forms pores on subsequent expansion.

26. The polymer fiber of claim 23, wherein the polyazole polymer extruded in step C) is saturated with a gas in a supercritical state so that the gas forms pores on subsequent expansion.

* * * * *